(12) United States Patent
Ahmed et al.

(10) Patent No.: US 10,056,785 B2
(45) Date of Patent: Aug. 21, 2018

(54) TUNABLE/DE-TUNABLE WIRELESS POWER RESONATOR SYSTEM AND RELATED METHODS

(71) Applicant: SEMICONDUCTOR COMPONENTS INDUSTRIES, LLC, Phoenix, AZ (US)

(72) Inventors: Abdullah Ahmed, Scarborough (CA); Gareth Pryce Weale, New Hamburg (CA)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 244 days.

(21) Appl. No.: 14/843,819

(22) Filed: Sep. 2, 2015

(65) Prior Publication Data
US 2017/0063157 A1    Mar. 2, 2017

(51) Int. Cl.
*H02J 50/12*  (2016.01)
*H02J 7/02*  (2016.01)

(52) U.S. Cl.
CPC ............ *H02J 50/12* (2016.02); *H02J 7/025* (2013.01)

(58) Field of Classification Search
CPC ................................. H02J 50/12; H02J 7/025
USPC ....................................................... 307/104
See application file for complete search history.

(56) References Cited

U.S. PATENT DOCUMENTS

| | | | | |
|---|---|---|---|---|
| 2012/0306284 A1* | 12/2012 | Lee | .......... | H02J 17/00 307/104 |
| 2013/0176653 A1* | 7/2013 | Kim | .......... | H02H 9/04 361/91.6 |

OTHER PUBLICATIONS

Chen et al., "A Study of Loosely Coupled Coils for Wireless Power Transfer," IEEE Transactions on Circuits and Systems—II: Express Briefs, V. 57, No. 7, pp. 536-540 (Jul. 2010).
Waters et al., "Adaptive Impedance Matching for Magnetically Coupled Resonators," PIERS Proceedings, Moscow, Russia, pp. 694-701 (Aug. 19-23, 2012).
Cannon et al., "Magnetic Resonant Coupling as a Potential Means for Wireless Power Transfer to Multiple Small Receivers," IEEE Transactions on Power Electronics, V. 24, No. 7, pp. 1819-1825 (Jul. 2009).

* cited by examiner

*Primary Examiner* — John Poos
(74) *Attorney, Agent, or Firm* — IPTechLaw

(57) ABSTRACT

A wireless power transmission (WPT) system. Implementations may include a power source coupled with a first wireless power transmission (WPT) system and a load coupled with a second WPT system including a sense circuit. The second WPT system, using the sense circuit, may be configured to dynamically tune a resonance of the second WPT system with the first WPT system to a desired resonance frequency value to allow transfer of a desired voltage or a desired power to the load. The desired resonance frequency value may be less than a maximum possible resonance frequency value. The first WPT system may be capable of transmitting more voltage or more power than the second WPT system or the load can receive without inducing damage to the second WPT system or the load.

21 Claims, 7 Drawing Sheets

TUNABLE/DE-TUNABLE WIRELESS POWER RESONATOR SYSTEM AND RELATED METHODS

BACKGROUND

1. Technical Field

Aspects of this document relate generally to systems for power transmission, such as wireless power transmission and/or wireless battery charging systems.

2. Background Art

Wireless power transfer using magnetically coupled coils is accomplished using both loosely coupled coils and tightly coupled coils (i.e., in a transformer). Loosely coupled coils do not have a common magnetic core and so use magnetic flux generated by the coil connected to the power source to inductively induce current in the other magnetically coupled coil connected to the load. Examples of conventional wireless power transfer systems may be found in the following references, the disclosures of each of which are hereby incorporated entirely herein by reference: the paper by Chen et al., "A Study of Loosely Coupled Coils for Wireless Power Transfer," *IEEE Transactions on Circuits and Systems—II: Express Briefs*, V. 57, No. 7, pp. 536-540 (July 2010); the paper by Waters et al., "Adaptive Impedance Matching for Magnetically Coupled Resonators," *PIERS Proceedings*, Moscow, Russia, pp. 694-701 (Aug. 19-23, 2012); the paper by Cannon et al., "Magnetic Resonant Coupling as a Potential Means for Wireless Power Transfer to Multiple Small Receivers," *IEEE Transactions on Power Electronics*, V. 24, No. 7, pp. 1819-1825 (July 2009).

SUMMARY

Implementations of a wireless power transmission system may include a power source coupled with a first wireless power transmission (WPT) system and a load coupled with a second WPT system including a sense circuit. The second WPT system, using the sense circuit, may be configured to dynamically tune a resonance of the second WPT system with the first WPT system to a desired resonance frequency value to allow transfer of a desired voltage or a desired power to the load. The desired resonance frequency value may be less than a maximum possible resonance frequency value. The first WPT system may be capable of transmitting more voltage or more power than the second WPT system or the load can receive without inducing damage to the second WPT system or the load.

Implementations of WPT systems may include one, all, or any of the following:

The sense circuit may be configured to tune a resonance of the second WPT system with the first WPT system through adjusting a frequency transmitted by the first WPT system or a frequency received by the second WPT system.

The sense circuit may be configured to tune a resonance of the second WPT system with the first WPT system through adjusting a capacitance of the second WPT system.

The sense circuit may be configured to adjust the capacitance of the second WPT system through adjusting a voltage bias of a voltage dependent capacitor included in the second WPT system using the sense circuit.

The second WPT system may include at least one stage including at least a first coil and the sense circuit may be configured to tune a resonance of the second WPT system with the first WPT system through detuning of the at least first coil to the desired resonance frequency value.

Implementations of WPT systems may utilize implementations of a method of wireless power transmission. The method may include providing a power source coupled with a first WPT system, providing a load coupled with a second WPT system, and tuning a resonance of the second WPT system with the first WPT system to a desired resonance frequency value to allow transfer of a desired voltage and a desired power to the load. The desired resonance frequency value may be less than a maximum possible resonance level. The first WPT system may be capable of transmitting more voltage or more power than the second WPT system or the load can receive without inducing damage to the second WPT system or the load.

Implementations of a method of wireless power transmission may include one, all, or any of the following:

Tuning a resonance of the second WPT system with the first WPT system may further include adjusting a frequency transmitted by the first WPT system or a frequency received by the second WPT system.

Tuning a resonance of the second WPT system with the first WPT system may further include adjusting a capacitance of the second WPT system.

The method may further include providing a second load coupled with a third WPT system and tuning a resonance of the third WPT system with the first WPT system to a desired resonance frequency value to allow transfer of a desired voltage or a desired power to a load. The desired resonance frequency value may be less than a maximum possible resonance frequency value. The first WPT system may be capable of transmitting more voltage or more power than the third WPT system or the second load can receive without inducing damage to the third WPT system or the second load.

The method may further include providing a second load coupled with a third WPT system where the third WPT system and second load are adapted to operate at the maximum possible resonance frequency value without inducing damage to the third WPT system or the second load.

The second WPT system may include a sense circuit and tuning the resonance of the second WPT system with the first WPT system may further include tuning using the sense circuit.

Tuning using the sense circuit may further include tuning by adjusting a frequency transmitted by the first WPT system or a frequency received by the second WPT system using the sense circuit.

Tuning the sense circuit may further include tuning by adjusting a capacitance of the second WPT system using the sense circuit.

Adjusting a capacitance of the second WPT system using the sense circuit may further include adjusting a voltage bias of a voltage dependent capacitor using the sense circuit.

The second WPT system may include a two stage resonator including a first coil and a second coil and tuning the resonance of the second WPT system with the first WPT system may further include detuning of the first coil or the second coil to the desired resonance frequency value.

The second WPT system may include a single stage resonator including a first coil and tuning the resonance of the second WPT system with the first WPT system further includes detuning of the first coil to the desired resonance frequency value.

Tuning the resonance of the second WPT system with the first WPT system may further include tuning after completion of an initial wireless power transmission through transmitting a feedback signal to the first WPT system to tune a resonance of the first WPT system or tuning the resonance of the second WPT system using a sense circuit included in the second WPT system.

Implementations of WPT systems may utilize implementations of a method of wireless power transmission. The method may include providing a power source coupled with a first WPT system, providing a load coupled with a second WPT system, and dynamically tuning a resonance of the second WPT system with the first WPT system to a desired resonance frequency value is less than a maximum possible resonance frequency value. The desired resonance frequency value may be less than a maximum possible resonance frequency value. The first WPT system may be capable of transmitting more voltage or more power than the second WPT system or the load can receive without inducing damage to the second WPT system or the load.

Implementations of a method of wireless power transmission may include one, all, or any of the following:

Dynamically tuning the resonance of the second WPT system with the first WPT system may further include tuning after completion of an initial wireless power transmission through transmitting a feedback signal from the second WPT system to the first WPT system to tune a resonance of the first WPT system.

The method may further include tuning through adjusting a frequency transmitted by the first WPT system in response to receiving the feedback signal from the second WPT system.

Dynamically tuning the resonance of the second WPT system with the first WPT system may further include tuning after completion of an initial wireless power transmission through tuning the resonance of the second WPT system using a sense circuit included in the second WPT system where the sense circuit adjusts a frequency received by the second WPT system, a capacitance of the second WPT system or any combination thereof.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended wireless power transmission systems (WPT) will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such WPT systems, and implementing components and methods, consistent with the intended operation and methods.

Various implementations of WPT systems and methods of wireless power transmission utilized by WPT system implementations are disclosed in this document. These systems and methods may utilize or include one, all, or any of the various components and functions of the systems outlined in the references incorporated herein by reference. The systems disclosed herein may be near field wireless charging systems.

Figure 1:
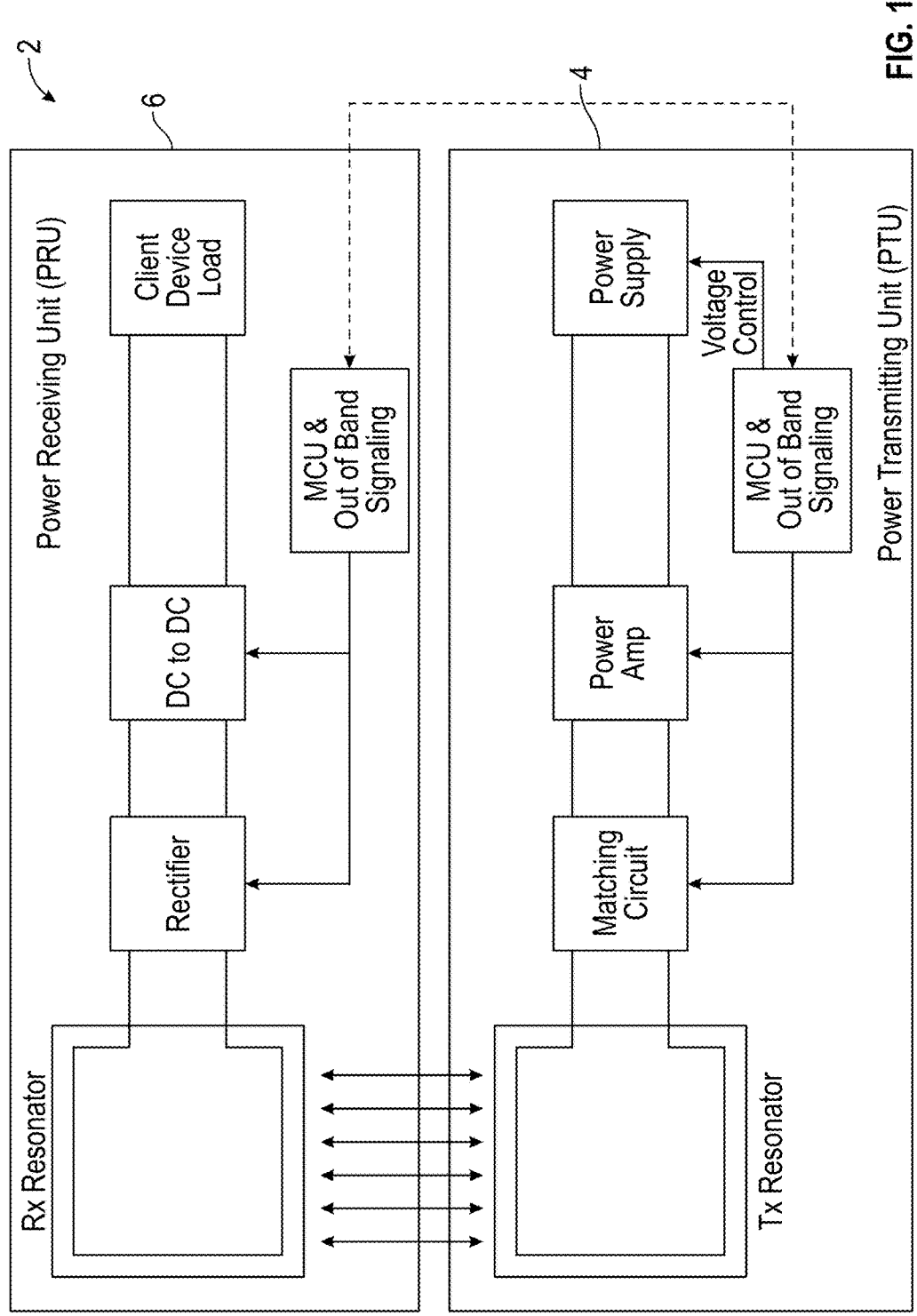
FIG. 1 is a block diagram of a wireless power transmission system.

Referring to FIG. 1, an implementation of a WPT system 2 is illustrated. As illustrated, the system 2 includes a transmission (Tx) side 4 (first WPT system) and a receiving (Rx) side 6 (second WPT system). A Tx Resonator is used to transmit power to a loosely magnetically coupled corresponding Rx Resonator which then provides the power to a Client Device Load (load). Depending upon the resonance frequency value between the Tx Resonator and the Rx Resonator, more or less power and/or voltage and/or current can be transmitted to the receiving side 6 and the load. In some WPT system implementations, the potential power and/or voltage that can be applied to the receiving side 6 may be in excess of the power and/or voltage which can be carried/handled by the any one or all of the components included in the receiving side 6 or the load itself. In such a situation, if the resonance frequency valueat the frequency of the transmitting or receiving side is too high, then too much power and/or voltage may be provided to the components in the receiving side 6 and/or the load, which can induce damage to the components of the WPT system and/or the load either in the short or long term.

Conventional WPT systems seek to maximize the resonance frequency value to ensure that power is transmitted to the receiving side at a maximum efficiency. This is because as the Tx Resonator and the Rx Resonator are only loosely coupled, it is more difficult to transfer the power and the loss between the resonators is correspondingly higher than in a closely/tightly coupled system (like a transformer). Because these systems seek to operate at a fixed point of maximum resonance, receiving sides/WPT systems that cannot handle the power and/or voltage provided by the transmission side 4 cannot be used with such transmission WPT systems without the use of external electrical protective components, which increase overall cost and consume space within the systems Various implementations of WPT systems are disclosed herein that allow the resonance of the receiving side 6 to be tuned to a desired resonance frequency value which is less than the maximum resonance frequency value which allows operation at maximum power transfer efficiency. This capability of the system permits receiving WPT system implementations to be used with transmitting WPT system that are capable of transmitting greater power/voltage than the receiving WPT system can handle without inducing damage to the system. Furthermore, this capability of the WPT systems may permit multiple types of receiving WPT systems and/or loads that operate at different power/voltage requirements to utilize the same transmitting WPT system without requiring the use of external electrical components to be applied to the receiving WPT system, the load, or both the WPT system and the load to protect the receiving WPT or the load from damage. In such systems, devices with receiving sides (third WPT systems) may be used that are designed to handle the full power and/or voltage from the transmitting side in conjunction with the devices that required tuning protection. As the output power ranges of transmitting WPT systems (power transmitter units, PTUs) can range from about 2 W to about 70 W, depending on the application, being able to flexibly charge different WPT systems using the same transmitting WPT system may be advantageous. Furthermore, where the receiving WPT system is included in a biomedical/wearable device such as, by non-limiting example, hearing aids, watches, and other wearable electronic devices, the space required to use external electrical components to protect the WPT system and/or the load may not be available. Since the induced voltage can be as high to tens to hundreds of volts depending on the receiving resonator coupling of the devices, damage to the receiving device can occur.

Figure 2:
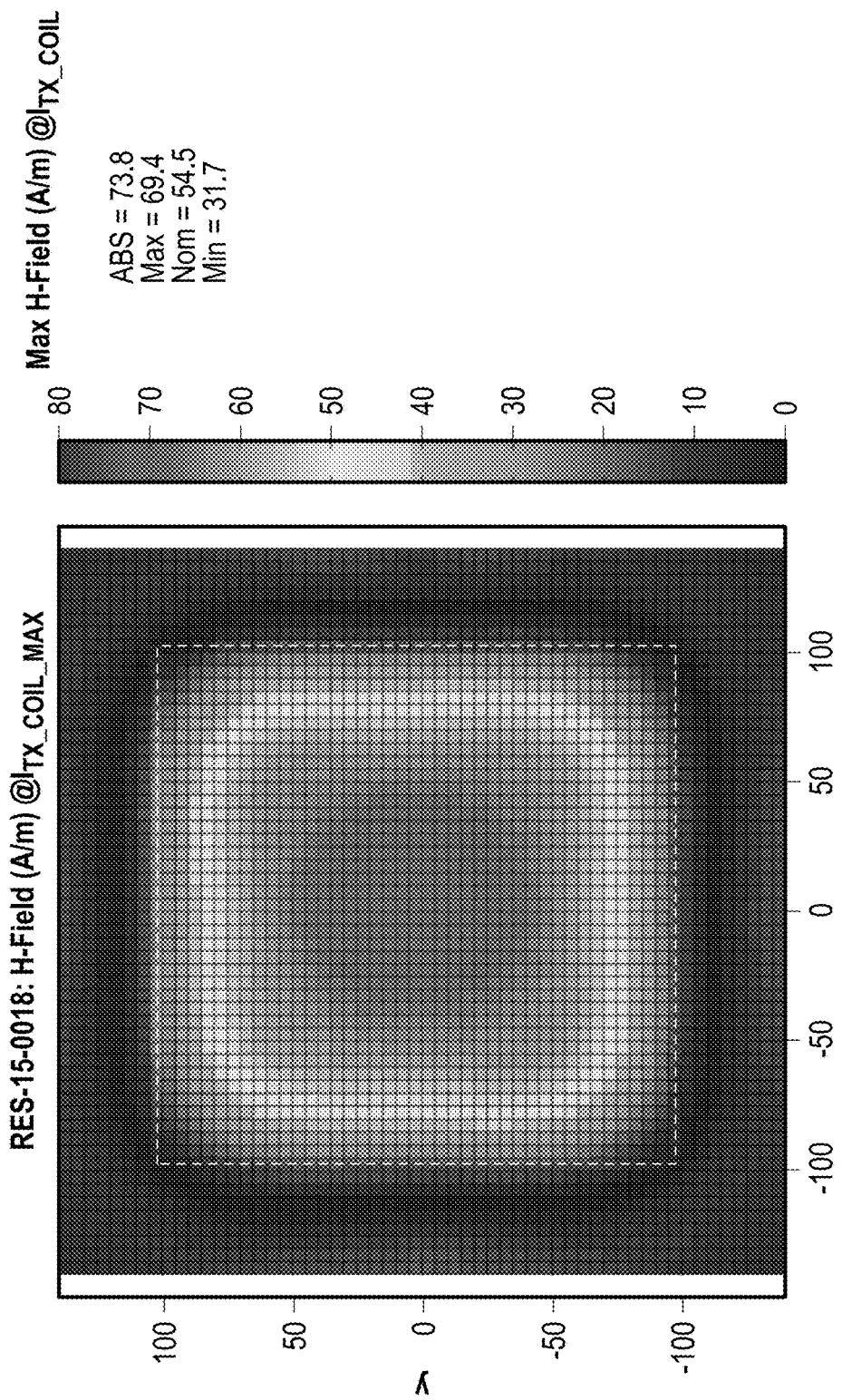
FIG. 2 is a plot of the magnetic field of a coil of a wireless power transmission system (WPT)

Referring to FIGS. 1 and 2, the Rx Resonator and Tx Resonator utilized in the system 2 use a square planar coil design that may have the magnetic flux field illustrated in FIG. 2. In other system implementations, however, circular, ellipsoidally shaped, or other closed shaped coils could be used, including planar coils, as could spiral coils formed in any closed shape. Various three dimensionally shaped coil designs may also be employed in various implementations, such as, by non-limiting example, bowl-shapes, cuboidal designs, conical (right or oblique) designs, parallelepiped designs, and other regular or irregular three-dimensional shaped designs. In various implementations, including those illustrated herein the resonator may be spiral inductor with N turns in combination with an external capacitor. A wide variety of electrical components could be used as part of the system 2 including rectifiers, DC to DC converters, matching circuits, power amplifiers, and voltage control circuits. As will be described in more detail herein, the transmitting side 4 and the receiving side 6 may include various master control (MCU) units and signaling units that allow for wireless communication between the transmitting side 4 and the receiving side 6.

Figure 3:
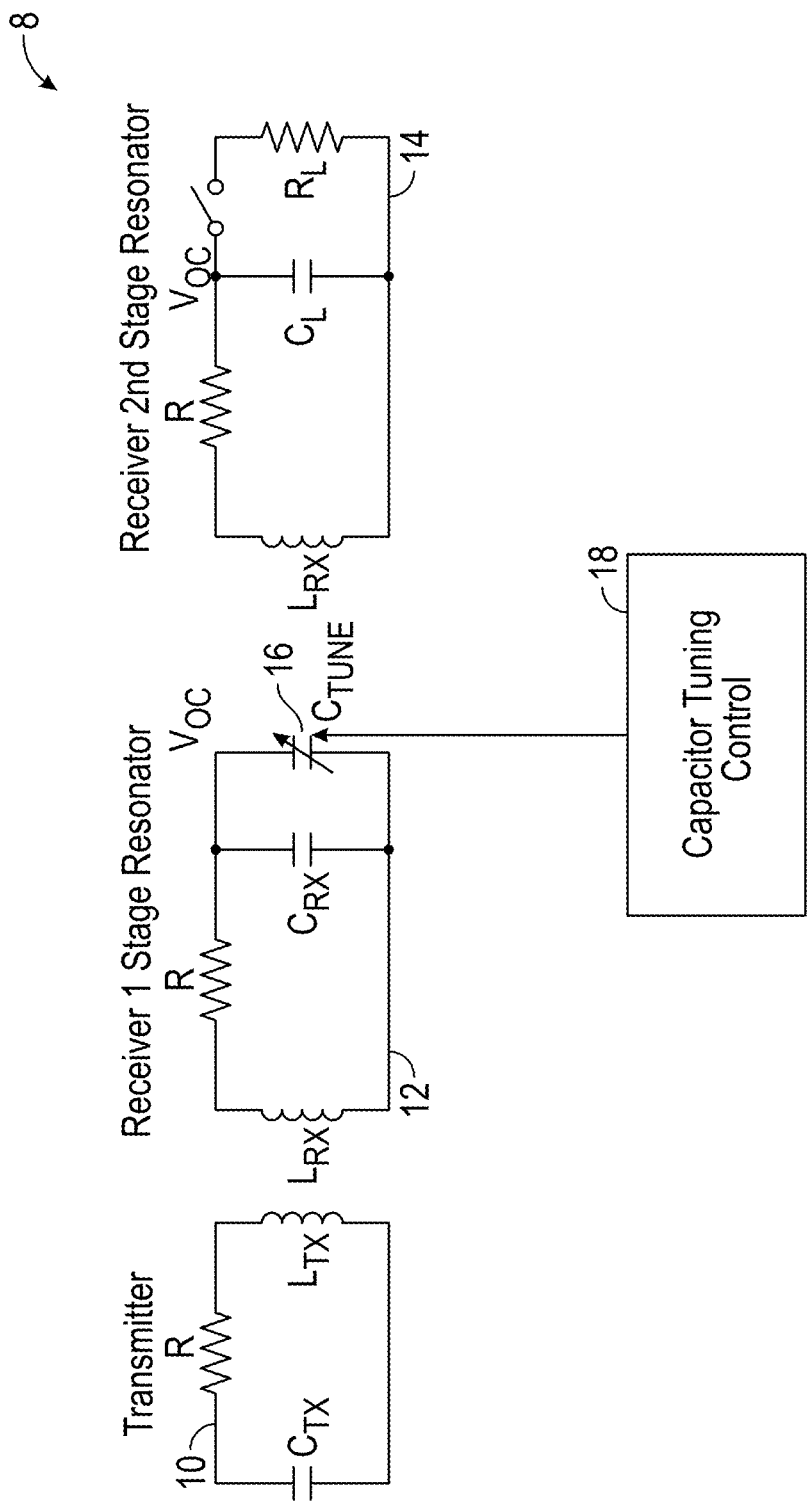
FIG. 3 is a circuit and block diagram of a portion of a first implementation of a WPT.

Referring to FIG. 3 a first implementation of a WPT system 8 is illustrated. As illustrated, the system 8 includes a transmitter 10 (first WPT system) which is coupled to a power supply (not shown). The receiving side of the system 8 includes two stages, Receiver 1 Stage Resonator (first stage 12) and Receiver $2^{nd}$ Stage Resonator (second stage 14). These stages are electrically coupled together through coils $L_{RX}$ on each stage to allow for transmission/conditioning of the power signal received from the transmitter 10 prior to the power being applied to the load $R_L$. In various implementations, the first stage 12 coil is a spiral inductor with N turns and the second stage 14 coil is a spiral inductor with N/2 turns that are closely coupled. As illustrated, the first stage 12 includes a voltage dependent capacitor 16 which creates a capacitance of the first stage $C_{TUNE}$ in combination with receiving capacitor $C_{RX}$. Any of a wide variety of voltage dependent capacitors could be used in various implementations. In particular implementations, the voltage dependent capacitors could be a passive tunable integrated circuit (PTIC) like that manufactured by ON Semiconductor of Phoenix, Ariz. An example of various implementations of PTICs can be found in the data sheet included herewith as Appendix A, the disclosure of which is hereby incorporated entirely herein by reference. In other implementations, the voltage dependent capacitor could not be used, and as will be described hereafter, a bank or array of capacitors coupled to switches may be used to adjust the capacitance of the first stage 12.

A capacitor tuning control 18 is included that is designed to adjust the capacitance of the voltage dependent capacitor 16 and, accordingly, adjust the resonance frequency value of the first stage 12. Because the resonance frequency value of the first stage 12 is adjustable through the adjustment of the capacitance of the first stage 12, the power/voltage received by/available to the second stage 14 and applied to the load will adjust correspondingly since the stages are closely coupled. Various implementations of capacitor tuning control circuits will be described hereafter. Additional stages (3, 4, or more.) could be included in various system implementations. Both the resonance of these and the second stage may be similarly tuned using the principles disclosed herein in various implementations.

Figure 4:
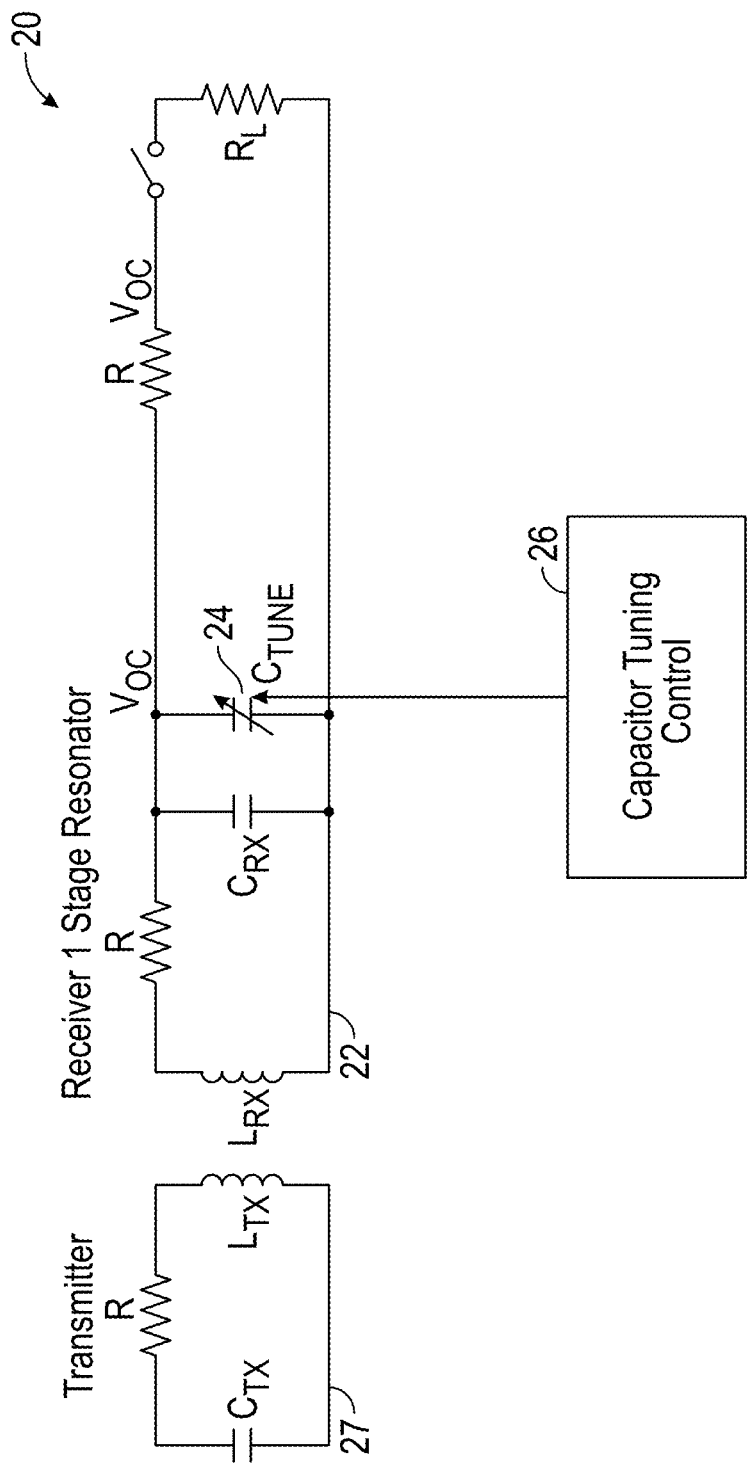
FIG. 4 is a circuit and block diagram of a portion of a second implementation of a WPT.

Referring to FIG. 4, a second implementation of a WPT system 20 is illustrated. As illustrated, the system 20 includes a single stage 22 on the receiving side (Receiver 1 Stage Resonator) which directly couples the coil $L_{RX}$ to the load $R_L$. A voltage dependent capacitor $C_{TUNE}$ 24 is included which is capable of altering the capacitance of the stage 22 in response to a bias voltage signal applied by Capacitor Tuning Control 26, which may be any implementation of capacitor tuning control circuit disclosed herein. Through adjustment of the capacitance of the single stage 22, the resonance frequency value of the coil $L_{RX}$ of the 22 with the transmitter 27 is tuned to a desired resonance frequency value and the amount of power/voltage being applied to the load is correspondingly directly adjusted.

Figure 5:
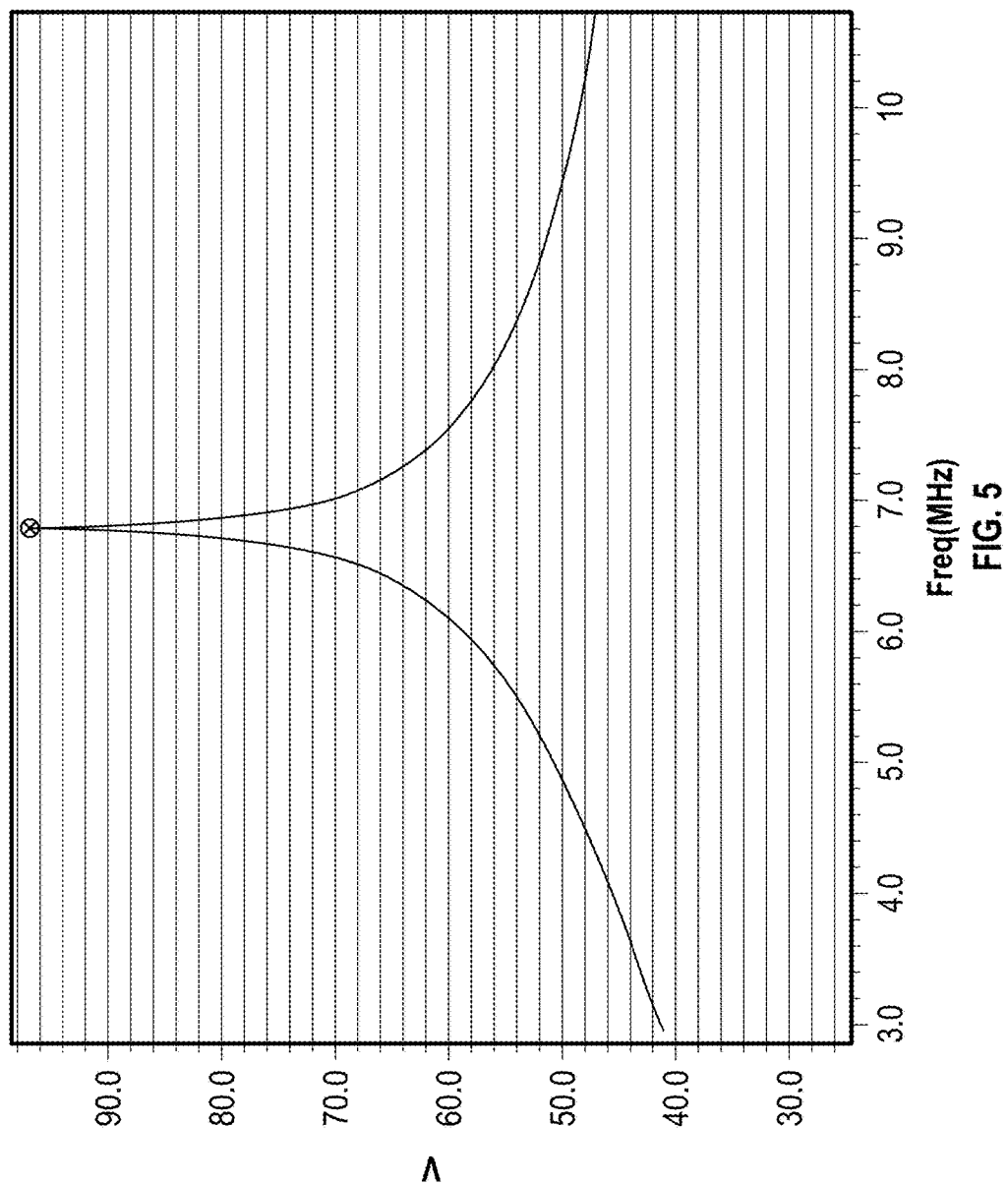
FIG. 5 is a diagram showing a frequency response of a conventional resonator with peak resonance at 6.78 MHz.

Implementations disclosed herein have discussed adjusting the capacitance of the receiving WPT system (second WPT system, or third, fourth, or more WPT systems) to tune the resonance frequency value of the receiving WPT system to a desired resonance level. In other implementations, the frequency of transmitting side or receiving side or both the transmitting and receiving side of the WPT system may be adjusted to tune the resonance frequency value of the system. By adjusting the resonance frequency value is meant adjusting the system's ability to receive/resonate with a particular frequency. Referring to FIG. 5, a graph of the received voltage by frequency in a conventional coil implementation is illustrated. As illustrated, there is a resonant frequency for the coil that produces a maximum resonance frequency value and, correspondingly permits maximum transmission of voltage between the transmitting coil and receiving coil. In this system, the resonant frequency is about 6.78 MHz, though in various other system implementations, other frequencies could be used, such as, by non-limiting example, about 13.56 MHz, about 27.12 MHz, about 2.4 GHz, and any other frequency capable of creating a resonant power transfer between a transmitting side and receiving side of a WPT system.

FIG. 5 illustrates how, on either side of the resonant frequency voltage maximum, the frequency received by the receiving side of the WPT system and/or transmitted by the transmitting side of the WPT system can be adjusted to reduce the voltage being transmitted. Since, as can be observed, the relationship between the voltage and the frequency is second order with respect to frequency, a small increase or decrease in the frequency from the resonant frequency can result in a large change in the transmitted voltage initially while larger changes result in smaller changes in the transmitted voltage. In various implementations, frequency tuners and other frequency adjusting devices and systems may be employed to adjust the frequency behavior of the transmitting, receiving, or both receiving side and transmitting side of the WPT system to achieve a desired resonance frequency value. Since the frequency changes move the frequency away from the resonant frequency, the process of adjusting the frequency being received and/or transmitted may be referred to as "detuning" the frequency and, correspondingly, the resonance frequency value of the WPT system. Through detuning of the resonance frequency, the voltage and/or power applied to the load is adjusted to prevent damage to the load or the components of the receiving side of the WPT system.

Other system parameters may also be adjusted to tune the resonance beyond capacitance including, by non-limiting example, quality coefficients, geometries of the receiving coil, and any other parameter capable of changing the resonance frequency value between the transmitting and receiving sides of a WPT system.

Figure 6A:
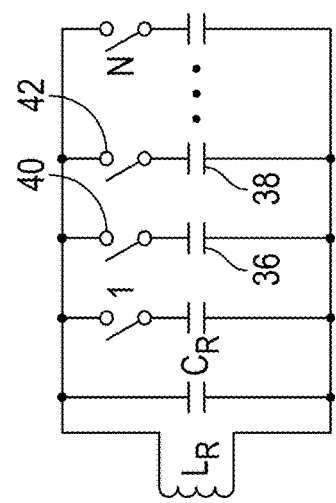
FIGS. 6A, B, and C are circuit diagrams of components of a first implementation of a sense circuit and capacitor array for adjusting the capacitance of a WPT system.
Figure 6B:
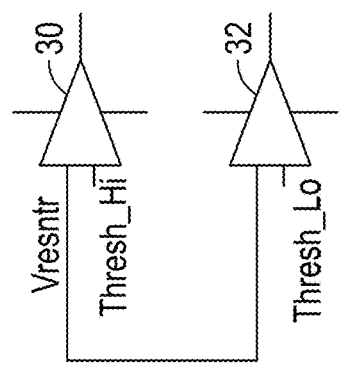

In various WPT system implementations, a sense circuit may be included in the receiving side of the WPT system (second WPT system). The sense circuit is designed to measure the voltage and/or power being applied to the receiving side (whether single stage, first stage, or other multi-stage) and then change an operating parameter of the receiving side to tune the resonance frequency value to a desired or calculated target value that will prevent inducing damage to the receiving side components and/or the load. Referring to FIG. 6B, an implementation of a portion of a sense circuit 28 is illustrated which includes two comparators 30, 32. The first comparator 30 receives the incoming voltage being received from the transmitting side ($V_{resntr}$) and compares it to a high threshold voltage (Thresh_Hi) and outputs the result. Likewise, the second comparator 32 receives the incoming voltage and compares it to a low threshold voltage (Thresh_Lo) and outputs the result. The threshold voltages may, in various implementations, be set by an on-chip reference circuit or other threshold voltage generating circuit. The high threshold voltage is set at a level designed to prevent damage to the components of the receiving side and/or the load. In some implementations, it may be set to be just below the value of the device reliability voltage limit for the device on a chip associated with the receiving side or load. The low threshold voltage may be set at a desired value to allow the sense circuit to tune the resonance to increase the voltage being received from the transmitting side.

Figure 6C:
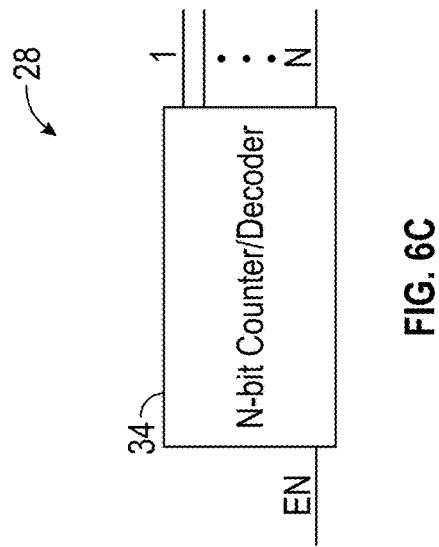

The outputs of the first and second comparators 30, 32 may be received by an N-bit Counter/Decoder 34 like that illustrated in FIG. 6C. The outputs may be processing using a clock or stored through use of one or more latches or even fuses in various implementations. In the implementation illustrated in FIG. 6C, the N-bit Counter/Decoder 34 stores/transmits the received output(s) and provides N bits of output that correspond with the received output(s). Referring to FIG. 6A, an implementation of an array of capacitors 36, 38 coupled in parallel is illustrated. As illustrated, each of the capacitors 36, 38 is coupled in series with switches 40, 42, respectively. Since the capacitor array is coupled to the coil LR, using the switches to connect/disconnect the capacitors 36, 38 changes the capacitance of the receiving side in a ratio of CR across CR. The change in capacitance varies the frequency of the coil LR, and the resonance of the coil with the transmitting coil. Since in various implementations, the switches may be each be coupled to an output of the N-bit Counter/Decoder 34 of FIG. 6C, as the N outputs change, the various switches open and close correspondingly. In this way, the capacitance of the receiving side (or a stage of the receiving side) can be altered to tune the resonance frequency value of the receiving side or stage. In such implementations, a voltage dependent capacitor is not used, but the sense circuit uses the incoming voltage to adjust the capacitance of the receiving side accordingly to achieve a desired resonance frequency value (and, correspondingly, a desired voltage/power value).

Figure 7:
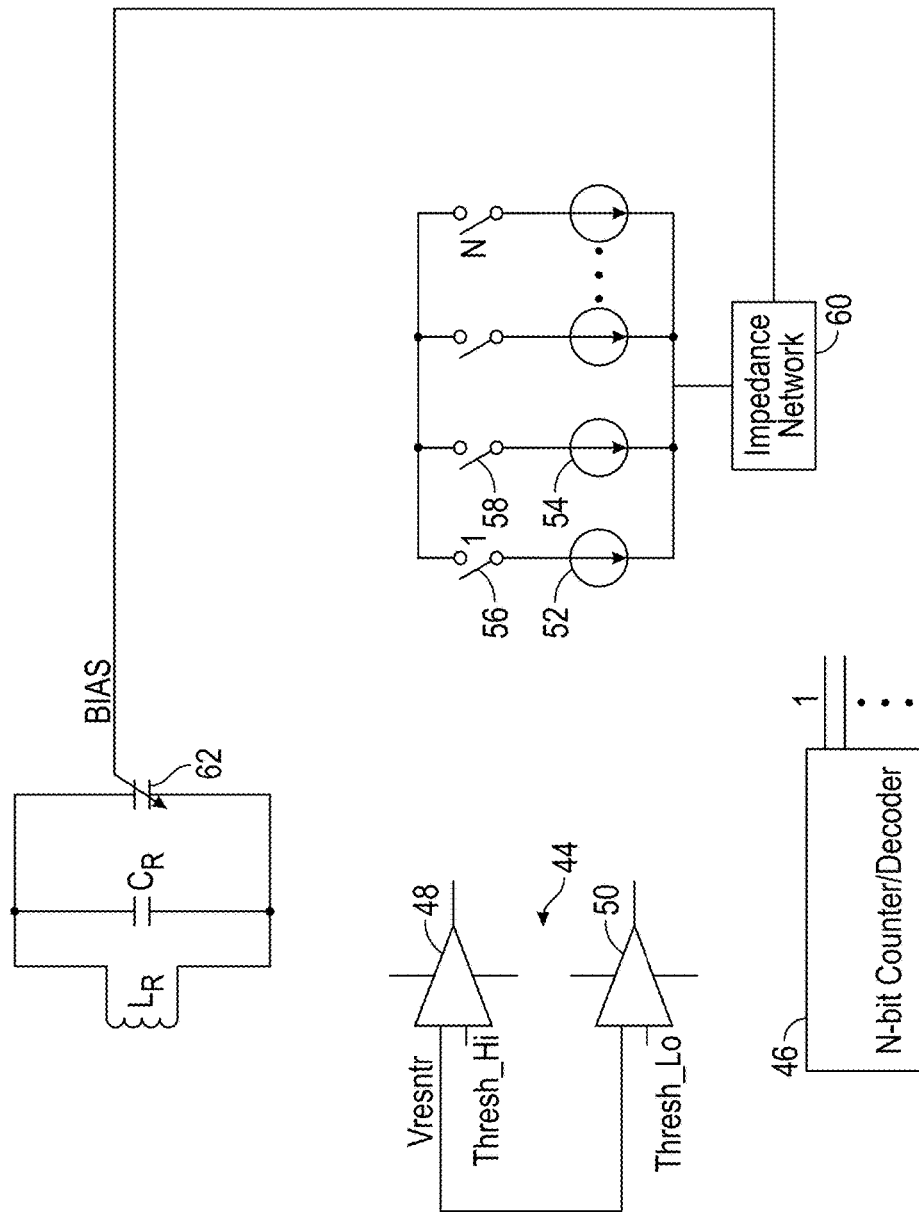
FIG. 7 is a circuit diagram of components of a sense circuit and system for adjusting the voltage bias applied to a voltage dependent capacitor used to adjust the capacitance of a WPT system.

Referring to FIG. 7, an implementation of a sense circuit 44 is illustrated adjacent to an N-bit Counter/Encoder 46 to which the outputs would be electrically coupled, similarly to the implementation illustrated in FIGS. 6B and 6C. As previously described, the sense circuit 44 monitors the incoming voltage $V_{resntr}$ and compares it to a high and low threshold value using comparators 48 and 50, respectively. The outputs of the comparators are then processed by the N-bit Counter/Encoder 46 which is coupled with an array of constant current sources 52, 54 each coupled in series with an array of switches 56, 58. The array of constant current sources 52, 54 is coupled to an impedance network 56 that together forms a decoder controlled bias voltage generator which assists in creating a voltage output that becomes the bias voltage applied to voltage dependent capacitor 62. As voltage dependent capacitor 62 is coupled with the receiving side circuitry, as the bias voltage changes, the capacitance of the receiving side changes, allowing for tuning of the resonance frequency value to one that will provide the desired voltage levels for use by the load.

While the sense circuit implementations illustrated in FIGS. 6A-C and 7 are involved in adjusting the capacitance to tune the resonance frequency value of a receiving side, sense circuit implementations could be used in combination with frequency tuning circuitry to change the frequency received and/or transmitted to also tune the resonance frequency value. Such sense circuit implementations could be included in the MCU & Out of Band Signaling components of the receiving side 6 and transmitting side 4 illustrated in FIG. 1. In such implementations, wireless transmissions containing a feedback signal from the receiving side 6 may be received by the transmitting side and the frequency, for example, adjusted accordingly in response to tune the resonance frequency value. Likewise, in a feedforward control manner, wireless transmissions containing a feedforward signal from the transmitting side 4 could be sent to the receiving side 6 so the receiving side 6 can adjust the frequency, capacitance, or frequency and capacitance of the receiving side 6 in response to receiving the feedforward signal. A wide variety of implementations are possible using the principles disclosed herein.

Although in various implementations, those that adjust capacitance of the receiving side or frequency of the receiving side are illustrated, through use of feedback signals, the frequency or other parameters controlling the power and/or voltage being transmitted by the transmitting side of the WPT systems may also be adjusted. However, in various implementations, it may be simpler to manage the frequency/capacitance/or other power or voltage adjusting parameter on the receiving side since the receiving side is typically the device designed to work with the transmitting charging station. Such a technique may allow the charging station design to be essentially universal while each device manages its resonance levels with the charging station to charge itself without inducing damage to its components.

Various WPT systems like those disclosed herein may utilize various implementations of a method of wireless power transmission. The method may include providing a power source coupled with a first WPT system (transmitting side) and providing a load coupled with a second WPT system (receiving side). The method may also include tuning a resonance of the second WPT system with the first WPT system to a desired resonance level to allow transfer of a desired voltage or a desired power to the load. The desired resonance level may be less than a maximum possible resonance level. The first WPT system may be capable of transmitting more voltage and/or more power than the second WPT system and/or the load can receive without inducing damage to the second WPT system or the load. In various implementations, the tuning may be dynamically done, meaning that it is controlled using a sense circuit or other system/method of automatically altering/tuning the resonance frequency value of the second WPT system like those disclosed herein. In others, the tuning may be manually done by a user manually selecting a resonance level through a selector switch or other manually set variable on the transmitting side or receiving side designed to ensure that the power/voltage resulting from the frequency being transmitted/received will not damage the receiving device. In various implementations, the tuning process may be referred to a detuning process since the tuning process moves the resonance frequency value away from the maximum resonance frequency value.

In various method and system implementations, no a priori or system calculated/detected value(s) of the maximum resonance frequency value may need to be known by the receiving side for the system to tune the resonance frequency value to find an operating point at which the desired voltage and/or power level are reached. Instead, the system, on wakeup or when encountering the signal from a transmitting side, may use the sense circuit or other control circuitry to tune the resonance until the desired voltage/and or power level are reached. In various implementations, the system may power up with the various control circuitry set to non-resonant values for safety purposes, and then subsequently adjusted. In various implementations, on power down, the control circuitry may also be reset to non-resonant values for safety purposes.

In various method implementations, the tuning of the resonance frequency value may take place after an initial wireless power transmission has taken place (which may or may not have passed through the load) between the transmitting side and the receiving side. In other implementations, both the capacitance and the frequency (frequency being received) of the receiving side may be tuned to adjust the resonance frequency value. In other implementations, the tuning of the resonance frequency value may be take place in response to feedback from the load. In these implementations, in response to the load indicating it needs more or less power or voltage, the control circuitry (sense circuit in some implementations) tunes the resonance of the receiving side coil to a desired/calculated level.

In places where the description above refers to particular implementations of WPT systems and implementing components, sub-components, methods and sub-methods, it should be readily apparent that a number of modifications may be made without departing from the spirit thereof and that these implementations, implementing components, sub-components, methods and sub-methods may be applied to other WPT systems.

What is claimed is:

1. A method of wireless power transmission, the method comprising:
providing a power source coupled with a first wireless power transmission (WPT) system;
providing a load coupled with a second WPT system;
detuning a resonance of the second WPT system with the first WPT system to a desired resonance frequency value to allow transfer of one of a desired voltage and a desired power to the load without damaging one of the second WPT system and the load;
wherein the desired resonance frequency value is less than a maximum possible resonance level; and
wherein the first WPT system is capable of transmitting one of more voltage and more power than one of the second WPT system and the load can receive without inducing damage to one of the second WPT system and the load.

2. The method of claim 1, wherein tuning the resonance of the second WPT system with the first WPT system further comprises adjusting one of a frequency transmitted by the first WPT system and a frequency received by the second WPT system.

3. The method of claim 1, wherein tuning the resonance of the second WPT system with the first WPT system further comprises adjusting a capacitance of the second WPT system.

4. The method of claim 1, further comprising:
providing a second load coupled with a third WPT system;
tuning a resonance of the third WPT system with the first WPT system to a desired resonance frequency value to allow transfer of one of a desired voltage and a desired power to the second load;
wherein the desired resonance frequency value is less than a maximum possible resonance frequency value; and
wherein the first WPT system is capable of transmitting one of more voltage and more power than one of the third WPT system and the second load can receive without inducing damage to one of the third WPT system and the second load.

5. The method of claim 1, further comprising:
providing a second load coupled with a third WPT system wherein the third WPT system and second load are adapted to operate at the maximum possible resonance frequency value without inducing damage to the third WPT system and the second load.

6. The method of claim 1, wherein the second WPT system comprises a sense circuit and tuning the resonance of the second WPT system with the first WPT system further comprises tuning using the sense circuit.

7. The method of claim 6, wherein tuning using the sense circuit further comprises tuning by adjusting one of a frequency transmitted by the first WPT system and a frequency received by the second WPT system using the sense circuit.

8. The method of claim 6, wherein tuning using the sense circuit further comprises tuning by adjusting a capacitance of the second WPT system using the sense circuit.

9. The method of claim 8, wherein adjusting a capacitance of the second WPT system using the sense circuit further comprises adjusting a voltage bias of a voltage dependent capacitor using the sense circuit.

10. The method of claim 1, wherein the second WPT system comprises a two stage resonator comprising a first coil and a second coil and tuning the resonance of the second WPT system with the first WPT system further comprises detuning of one of the first coil and the second coil to the desired resonance frequency value.

11. The method of claim 1, wherein the second WPT system comprises a single stage resonator comprising a first coil and tuning the resonance of the second WPT system with the first WPT system further comprises detuning of the first coil to the desired resonance frequency value.

12. The method of claim 1, wherein tuning the resonance of the second WPT system with the first WPT system further comprises tuning after completion of an initial wireless power transmission through one of:
   transmitting a feedback signal to the first WPT system to tune a resonance of the first WPT system; and
   tuning the resonance of the second WPT system using a sense circuit comprised in the second WPT system.

13. A method of wireless power transmission, the method comprising:
   providing a power source coupled with a first wireless power transmission (WPT) system;
   providing a load coupled with a second WPT system;
   dynamically detuning a resonance of the second WPT system with the first WPT system to a desired resonance frequency value to allow transfer of one of a desired voltage and a desired power to the load without damaging one of the second WPT system and the load;
   wherein the desired resonance frequency value is less than a maximum possible resonance frequency value; and
   wherein the first WPT system is capable of transmitting one of more voltage and more power than one of the second WPT system and the load can receive without inducing damage to one of the second WPT system and the load.

14. The method of claim 13, wherein dynamically tuning the resonance of the second WPT system with the first WPT system further comprises tuning after completion of an initial wireless power transmission through transmitting a feedback signal from the second WPT system to the first WPT system to tune a resonance of the first WPT system.

15. The method of claim 14, further comprising tuning through adjusting a frequency transmitted by the first WPT system in response to receiving the feedback signal from the second WPT system.

16. The method of claim 13, wherein dynamically tuning the resonance of the second WPT system with the first WPT system further comprises tuning after completion of an initial wireless power transmission through tuning the resonance of the second WPT system using a sense circuit comprised in the second WPT system wherein the sense circuit adjusts one of a frequency received by the second WPT system, a capacitance of the second WPT system; and any combination thereof.

17. A wireless power transmission system comprising:
   a power source coupled with a first wireless power transmission (WPT) system;
   a load coupled with a second WPT system comprising a sense circuit;
   wherein the second WPT system, using the sense circuit, is configured to dynamically detune a resonance of the second WPT system with the first WPT system to a desired resonance frequency value to allow transfer of one of a desired voltage and a desired power to the load without damaging one of the second WPT system and the load;
   wherein the desired resonance frequency value is less than a maximum possible resonance frequency value; and
   wherein the first WPT system is capable of transmitting one of more voltage and more power than one of the second WPT system and the load can receive without inducing damage to one of the second WPT system and the load.

18. The system of claim 17, wherein the sense circuit is configured to tune a resonance of the second WPT system with the first WPT system through adjusting one of a frequency transmitted by the first WPT system and a frequency received by the second WPT system.

19. The system of claim 17, wherein the sense circuit is configured to tune a resonance of the second WPT system with the first WPT system through adjusting a capacitance of the second WPT system.

20. The system of claim 19, wherein the sense circuit is configured to adjust the capacitance of the second WPT system through adjusting a voltage bias of a voltage dependent capacitor comprised in the second WPT system using the sense circuit.

21. The system of claim 17, wherein the second WPT system comprises at least one stage comprising at least a first coil and the sense circuit is configured to tune a resonance of the second WPT system with the first WPT system through detuning of the at least first coil to the desired resonance frequency value.

\* \* \* \* \*